United States Patent [19]
Krause et al.

[11] 3,771,073
[45] Nov. 6, 1973

[54] ULTRASONIC DEVICES USING GERMANIUM-CONTAINING CHALOGENIDE GLASSES

[75] Inventors: John Thorvald Krause, New Providence; Charles Robert Kurkjian, Bernards Township, Somerset County, both of N.J.

[73] Assignee: Bell Telephone Laboratories, Incorpoated, Murray Hill, N.J.

[22] Filed: Dec. 20, 1971

[21] Appl. No.: 209,980

Related U.S. Application Data

[62] Division of Ser. No. 54,189, July 13, 1970, Pat. No. 3,655,255.

[52] U.S. Cl. .............................. 333/30 R, 106/47 R
[51] Int. Cl. ....... H03h 7/30, C03c 3/12, C03c 3/00
[58] Field of Search ................. 106/47 R; 333/30 R; 181/.5 AP, 47 R

[56] References Cited
UNITED STATES PATENTS

| | | | |
|---|---|---|---|
| 3,360,649 | 12/1967 | Brau et al. | 106/47 R |
| 3,370,964 | 2/1968 | Hilton, Jr. et al. | 106/47 R |
| 3,370,965 | 2/1968 | Hilton, Jr. et al. | 106/47 R |
| 3,413,187 | 11/1968 | Krause et al. | 106/47 R |
| 3,451,794 | 6/1969 | Patterson | 106/47 R |
| 3,517,345 | 6/1970 | Krause | 106/47 R |
| 3,655,255 | 4/1972 | Krause et al. | 106/47 R |

OTHER PUBLICATIONS

Hilton, A. R. et al., "New High Temperature Infrared Transmitting Glasses–II", 1964, Infrared Physics 4, 213–221, QC490, P6

Goryanous, N. A., "Vitreous Semiconductors," 1960, Soviet Physics, Solid State 2, 258–261, QC 176, 568

*Primary Examiner*—A. B. Curtis
*Assistant Examiner*—Mark Bell
*Attorney*—W. L. Keefauver et al.

[57] ABSTRACT

Ultrasonic devices are described which are dependent for their operation on certain germanium-containing compositions of the chalcogenide family of glasses. The ultrasonic devices exhibit acoustic losses comparable to those of devices made from fused silica.

6 Claims, 8 Drawing Figures

3,771,073

ULTRASONIC DEVICES USING GERMANIUM-CONTAINING CHALOGENIDE GLASSES

CROSS REFERENCE TO RELATED APPLICATION

This application is a division of my copending application, Ser. No. 54,189, filed July 13, 1970 and issued as U.S. Pat. No. 3,655,255 on Apr. 11, 1972.

BACKGROUND OF THE INVENTION

1. Field of the Invention

This invention relates to acoustic devices such as ultrasonic delay lines, which depend for their operation upon germanium-containing chalcogenide glasses.

2. Prior Art

The field of communications research has for some time included efforts to find glasses other than fused silica which exhibit low acoustic losses. Such materials would be candidates for use in a variety of significant communications devices both commercial and experimental. Examples include acoustic transmission devices such as ultrasonic delay lines and the so-called acousto-optic devices such as modulators, deflectors, correlators, switches, etc.

Of major concern for acoustic devices are glassy materials having low acoustic loss. Glasses are generally preferred over crystalline materials since they are invariably isotropic with respect to elastic waves, that is, they lack crystallographic axes, thus obviating the need to orient to preferred directions. In addition, glasses are generally more easily obtainable in large sections of optical quality than are single crystalline materials. No known glasses have been found to exhibit as low an acoustic loss as fused silica. Unfortunately, fused silica also exhibits a significant negative temperature coefficient of delay time, requiring for more critical applications a thermostated enclosure or its use with higher loss glasses or with single crystalline materials in a composite element. The search, therefore, continues for glassy materials having both low loss and zero or near zero temperature coefficients of delay time.

SUMMARY OF THE INVENTION

The invention resides in the discovery that certain glass compositions are suitable for use in a wide variety of otherwise known acoustic devices. These glasses include ternary compositions of non-oxide chalcogenide glasses containing germanium, including compositions from the ternary systems Ge-As-Se, Ge-P-S, Ge-P-Se, Ge-As-S and Ge-Sb-Se, Ge-Sb-S and have been found to have acoustic losses comparable to that of fused silica.

The term "acoustic" is intended to include any elastic wave, including those within the audio, sonic, supersonic and ultrasonic frequency ranges. However, in general, acousto-optic device requirements call for the elastic wavelength to be equal to or greater than one-half of the optical wavelength in the acousto-optic medium.

While several typical embodiments of devices are described, it is to be understood that the materials are useful in virtually all acoustic applications.

BRIEF DESCRIPTION OF THE DRAWING

FIG. 3 is a ternary composition diagram showing the low-loss range of compositions in the system Ge-Se-As;

FIG. 4 is a diagram similar to that of FIG. 3 for the system Ge-S-As;

DETAILED DESCRIPTION

Devices

Figure 1:
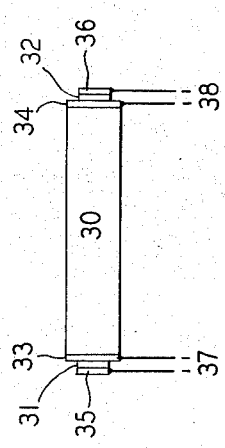
FIG. 1 is a diagrammatic view of an acoustic transmission device utilizing one of the herein-described glass compositions as the transmitting medium.

Referring now to FIG. 1, there is shown one embodiment of an ultrasonic device in accordance with the invention, including ultrasonic transmission medium 30, piezoelectric transducers 31 and 32 attached to opposite parallel faces of medium 30 by means of bonding layers 33 and 34, which layers also act as electrodes. Additional electrodes 35 and 36 are attached to the external bases of transducers 31 and 32. Electrical input to and output from transducers 31 and 32 is through leads 37 and 38, each attached to an electrode pair and connected to appropriate circuitry, not shown. Delay medium 30, although depicted as having a rectangular shape, may be of any shape, such as cylindrical and polygonal, and size to give delay times consistent with the intended device application. Typical delay times could be from 10 to 1,000 microseconds. At least one face of the delay medium should be smooth and preferably polished so that the input and output transducers may be affixed thereto in such a manner as to minimize distortion of the acoustic pulses.

The transducers 31 and 32 may be any of a number of piezoelectric crystals known to be useful for converting electric energy to acoustic energy, such as sodium, potassium niobate, lithium niobate and quartz.

It is a particular advantage of the materials herein described that they may be formed with relative ease into large sections of optical quality and may therefore find use in large delay line configurations having delay times of the order of 1,000 microseconds.

Figure 2:
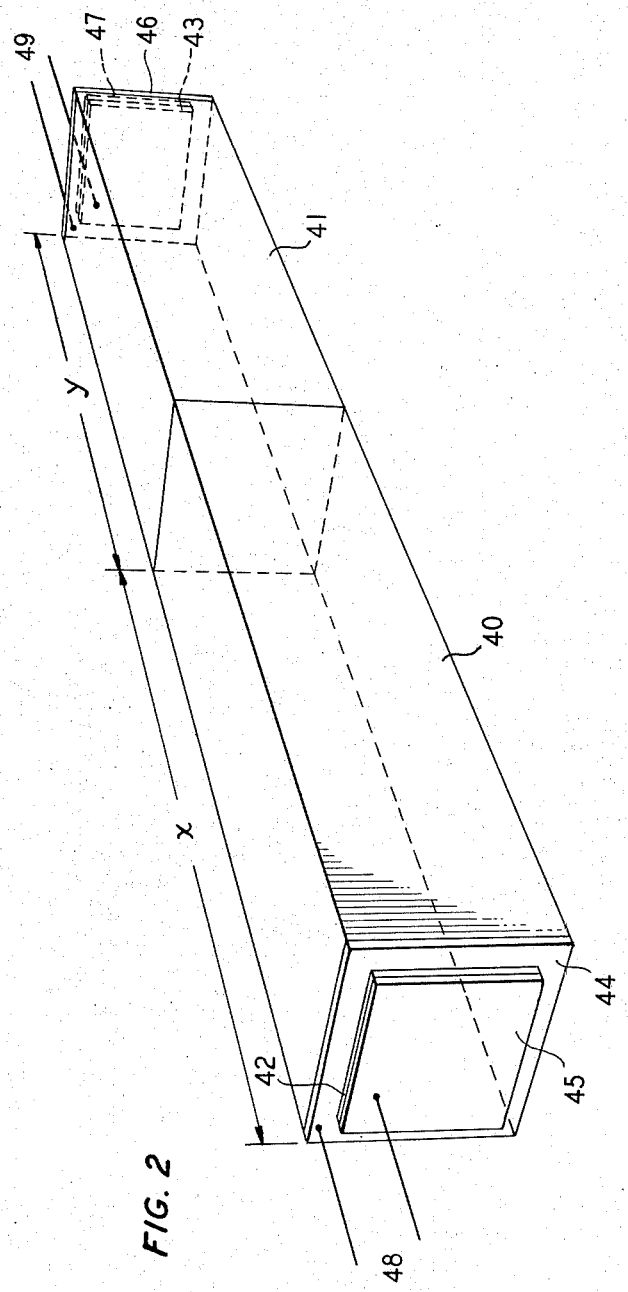
FIG. 2 is a diagrammatic view of a composite acoustic transmission device utilizing one of the hereindescribed glass compositions as one of the elements of the acoustic transmission medium.

Referring now to FIG. 2, there is shown another embodiment of an ultrasonic delay line in which the delay medium is a composite structure comprised of a material 40 of the invention and a second delay medium 41. Such a structure is described in copending application Ser. No. 601,716 filed Dec. 14, 1966, now U.S. Pat. No. 3,517,345, assigned to the present assignee. As is pointed out in the copending application, the materials are advantageously chosen to have temperature coefficients of delay time that are opposite in sign and lengths such that a zero temperature coefficient results for the composite structure. In the figure, the two sections 40 and 41 of the delay medium are shown to have lengths $x$ and $y$. Electromechanical transducers 42 and 43 and electrodes 44, 45, 46 and 47 and leads 48 and 49 are provided in the customary manner. The relative lengths $x$ and $y$ are computed from the relationship:

$$adx = bd'y \tag{1}$$

where $a$ and $b$ are the absolute values of the coefficients of delay time versus temperature and have opposite signs and $d$ and $d'$ are the unit delay times for the materials having their lengths defined as $x$ and $y$, respectively. The total desired delay time is given by $dx + d'y$. A suitable delay medium having a sign of delay time opposite to that of the glasses described herein for use in the composite structure is fused silica.

Glass Compositions

The regions of low acoustic loss glass compositions occur within larger glass-forming regions of the ternary systems containing germanium, one element from the group including sulphur and selenium, and one element from the group including arsenic, phosphorus, and antimony. For each system, the low loss compositions may be defined by the area enclosed by connecting with straight lines the following point pairs on the ternary diagrams.

Figure 3:
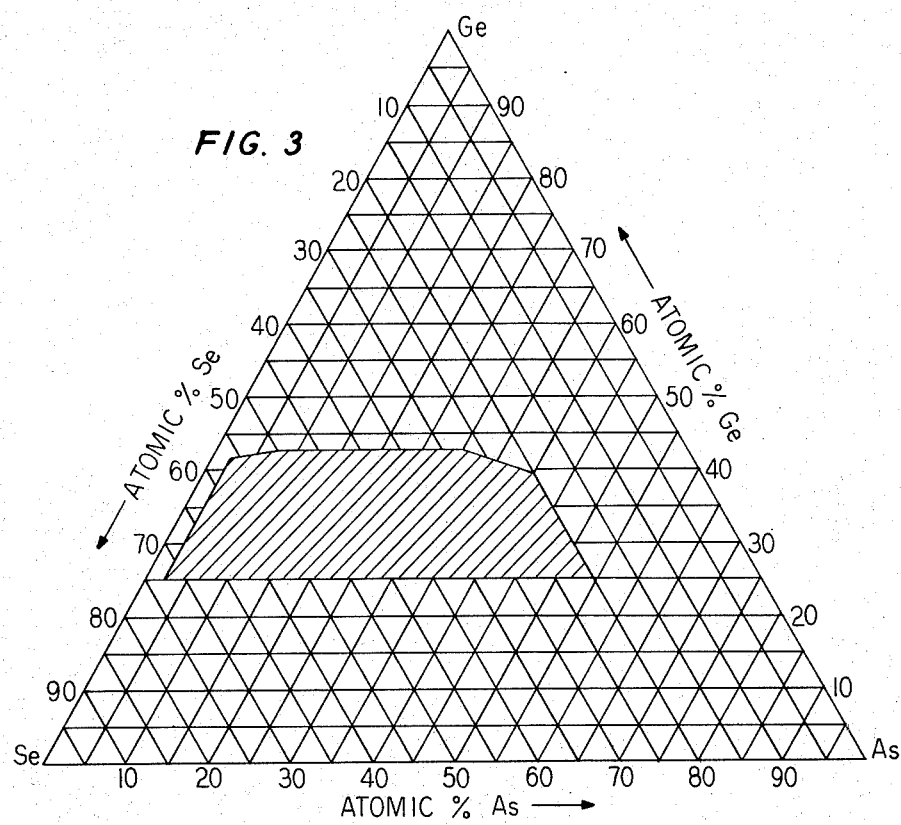

For the system Ge-Se-As, shown in FIG. 3, the point pairs are defined by the following compositions in atom percent:

43 Ge, 27 Se, 30 As — 40 Ge, 20 Se, 40 As
40 Ge, 20 Se, 40 As — 25 Ge, 20 Se, 55 As
25 Ge, 20 Se, 55 As — 25 Ge, 73 Se, 2 As
25 Ge, 73 Se, 2 As — 42 Ge, 56 Se, 2 As
42 Ge, 56 Se, 2 As — 43 Ge, 27 Se, 30 As.

Figure 4:
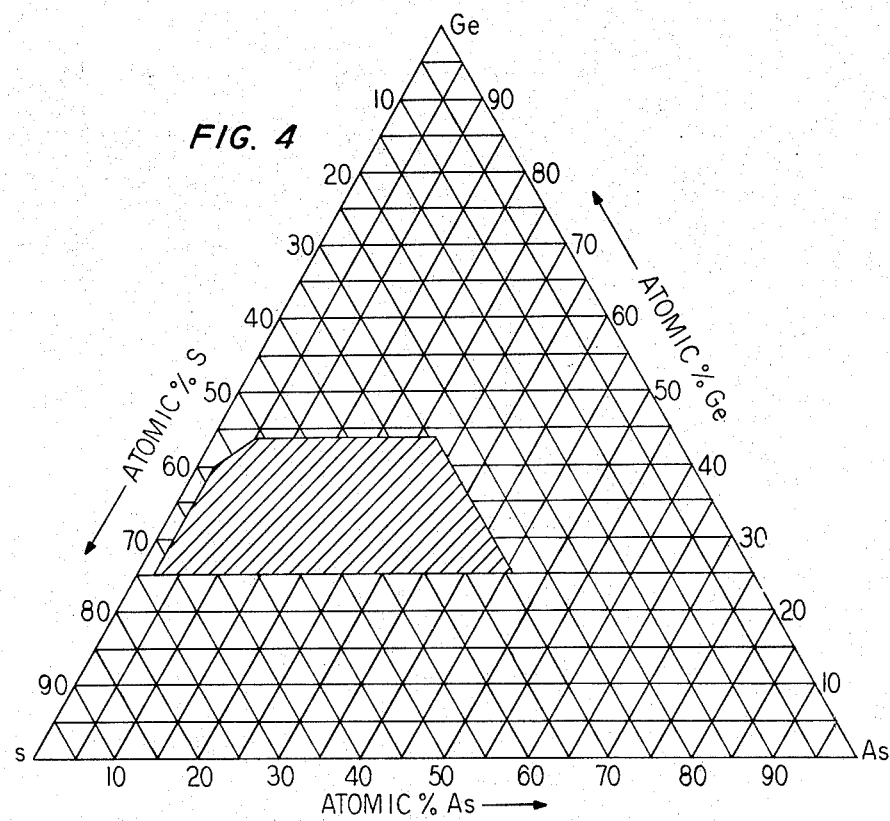

For the system Ge-S-As shown in FIG. 4, the point pairs are defined by the following compositions in atom percent:

44 Ge, 29 S, 27 As — 25 Ge, 29 S, 46 As
25 Ge, 29 S, 46 As — 25 Ge, 73 S, 2 As
25 Ge, 73 S, 2 As — 40 Ge, 58 S, 2 As
40 Ge, 58 S, 2 As — 44 Ge, 50 S, 6 As
44 Ge, 50 S, 6 As — 44 Ge, 29 S, 27 As.

Figure 5:
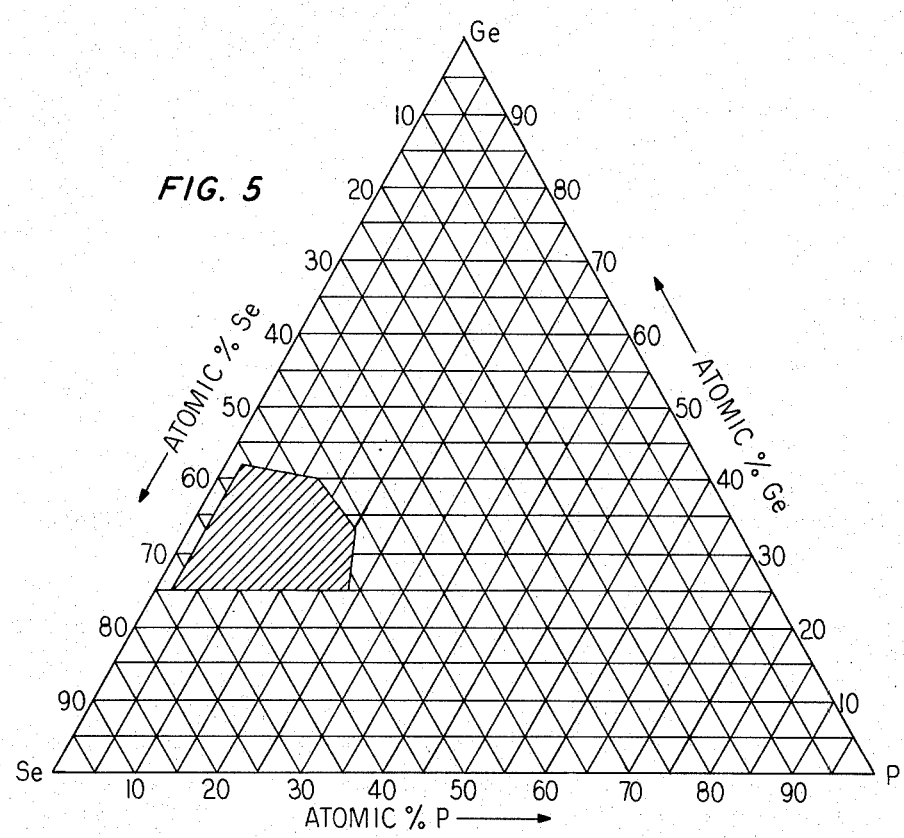
FIG. 5 is a diagram similar to that of FIG. 3 for the system Ge-Se-P.

For the system Ge-Se-P shown in FIG. 5, the point pairs are defined by the following compositions in atom percent:

40 Ge, 48 Se, 12 P — 33 Ge, 47 Se, 20 P
33 Ge, 47 Se, 20 P — 25 Ge, 52 Se, 23 P
25 Ge, 52 Se, 23 P — 25 Ge, 73 Se, 2 P
25 Ge, 73 Se, 2 P — 42 Ge, 56 Se, 2 P
42 Ge, 56 Se, 2 P — 40 Ge, 48 Se, 12 P.

Figure 6:
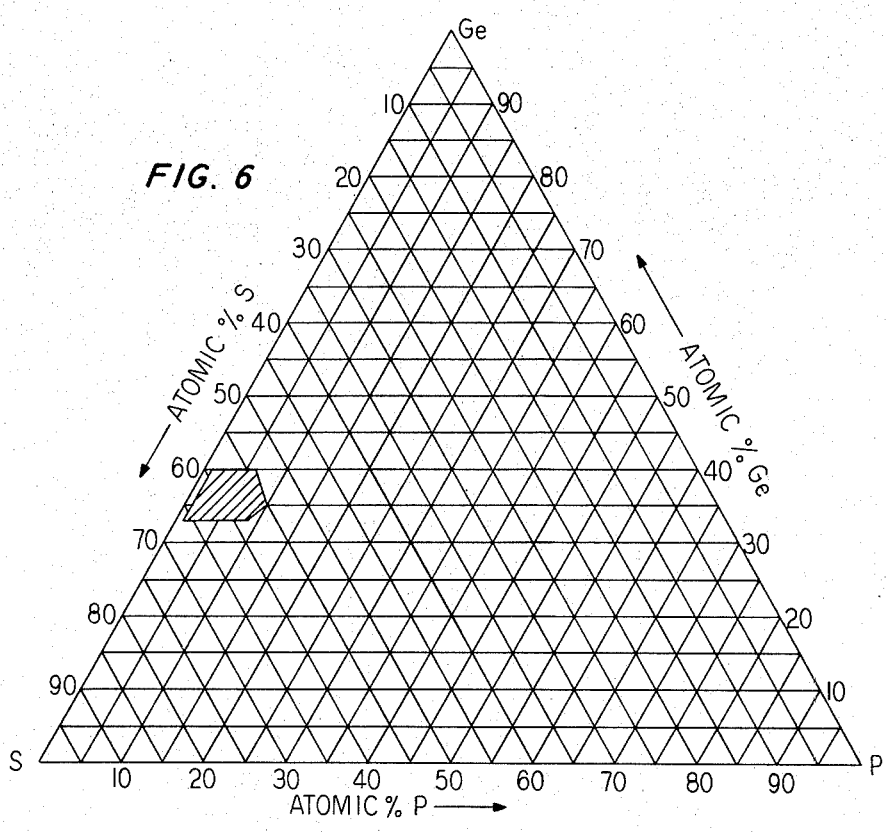
FIG. 6 is a diagram similar to that of FIG. 3 for the system Ge-S-P.

For the system Ge-S-P shown in FIG. 6, the point pairs are defined by the following compositions in atom percent:

40 Ge, 54 S, 6 P — 35 Ge, 55 S, 10 P
35 Ge, 55 S, 10 P — 33 Ge, 58 S, 9 P
33 Ge, 58 S, 9 P — 33 Ge, 66 S, 1 P
33 Ge, 66 S, 1 P — 40 Ge, 59 S, 1 P
40 Ge, 59 S, 1 P — 40 Ge, 54 S, 6 P.

Figure 7:
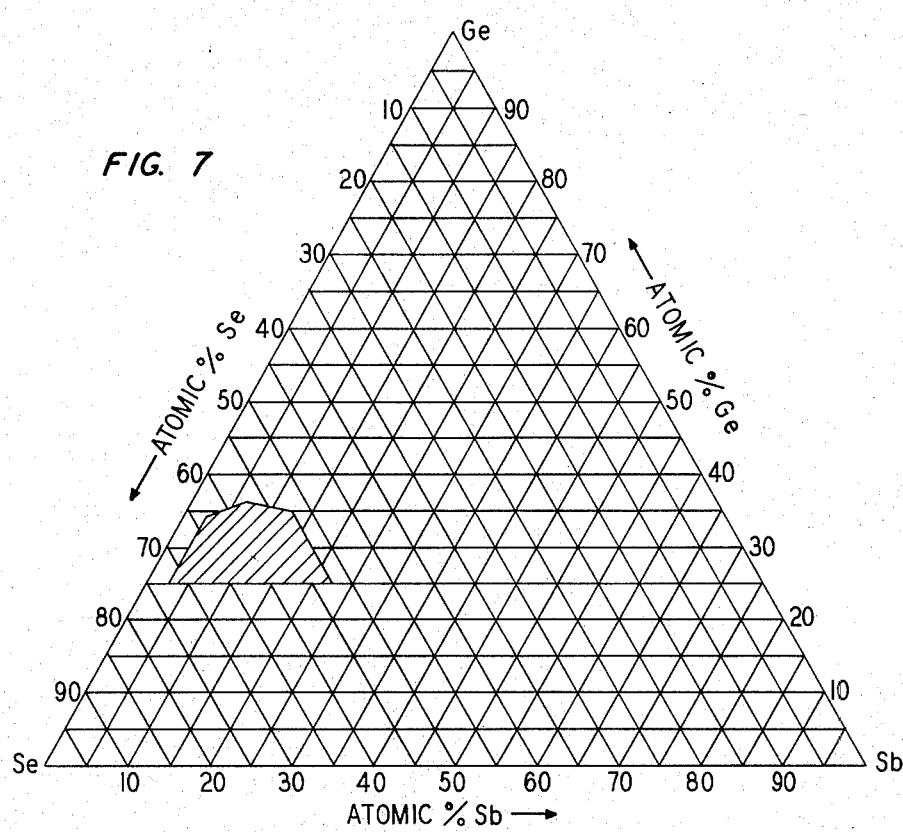
FIG. 7 is a diagram similar to that of FIG. 3 for the system Ge-Se-Sb.

For the system Ge-Se-Sb, shown in FIG. 7, the point pairs are defined by the following compositions in atom percent:

37 Ge, 57 Se, 6 Sb — 35 Ge, 52 Se, 13 Sb
35 Ge, 52 Se, 13 Sb — 25 Ge, 52 Se, 23 Sb
25 Ge, 52 Se, 23 Sb — 25 Ge, 73 Se, 2 Sb
25 Ge, 73 Se, 2 Sb — 34 Ge, 64 Se, 2 Sb
34 Ge, 64 Se, 2 Sb — 37 Ge, 57 Se, 6 Sb.

Figure 8:
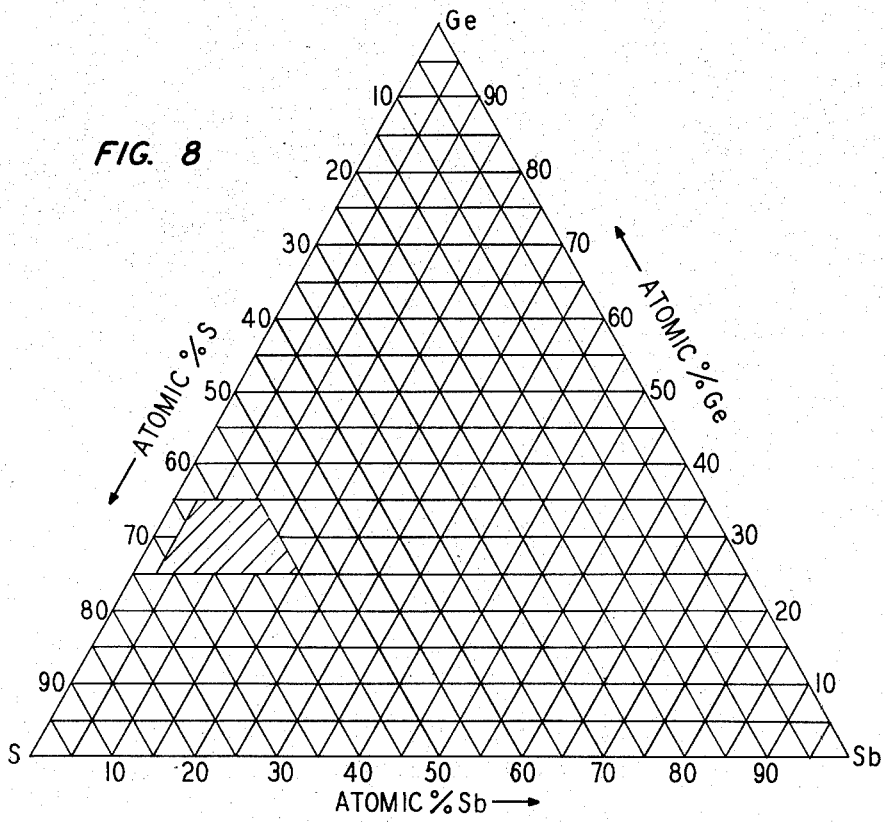
FIG. 8 is a diagram similar to that of FIG. 3 for the system Ge-S-Sb.

For the system Ge-S-Sb, shown in FIG. 8, the point pairs are defined by the following compositions in atom percent:

35 Ge, 63 S, 2 Sb — 35 Ge, 55 S, 10 Sb
35 Ge, 55 S, 10 Sb — 25 Ge, 55 S, 20 Sb
25 Ge, 55 S, 20 Sb — 25 Ge, 73 S, 2 Sb
25 Ge, 73 S, 2 Sb — 35 Ge, 63 S, 2 Sb.

In each of the six above-described ternary systems, the low-loss characteristics may be substantially retained and certain other beneficial effects realized by substituting up to about 50 percent by weight of 5a for 5a elements or 6a for 6a elements. Such substitutions may result in improved chemical or physical stability, and may be utilized to achieve some adjustment of working characteristics such as softening point, as is known to those skilled in the glassmaking art. Other additives or unintended impurities such as transition elements or alkali metals, should ordinarily be kept below about 0.1 percent total for best results, although may be as high as 0.5 percent without substantial impairment of low-acoustic-loss characteristics. Thus, commercially available starting materials are generally suitable for use in preparing such glasses for delay line applications.

The usual methods for preparing these types of glasses are generally known and thus not a necessary part of this description; they are described, for example, in U.S. Pat. No. 3,370,964, issued to A. R. Hilton on Feb. 27, 1968, and by A. D. Pearson in *Journal of Non-Crystalline Solids*, Volume 2, January, 1970, p. 2.

EXAMPLE 1

A glass having the composition in atom percent 33 Ge, 12 As, 55 Se was prepared and samples of the glass were prepared for testing.

Acoustic loss and acoustic velocity measurements were made at frequencies of 20 MHz and 500 MHz using the pulse echo technique in which one transducer was used both to transmit and receive pulses. Loss was determined by measuring the rate of decay of the received pulse echoes. Velocity was determined by utilizing a refinement of the pulse superposition technique. The details of this technique may be found in *J. Acoust. Soc. Am.* 34 609 (1962). Transducers were polished x-cut quartz plates. In addition to these measurements, various other properties were also determined. Results are presented in Table II together with some representative values for fused silica.

TABLE II

| Properties | | Values 33 Ge, 12 As, 55 Se Chalcogenide Glass | Fused Silica |
|---|---|---|---|
| Loss dB/cm at 500 MHz | Shear | 9.4 | 4.4 |
|  | Longit. | 7.1 | 3.2 |
| Velocity cm/sec × $10^5$ | Shear | 1.432 | 3.774 |
|  | Longit. | 2.518 | 5.973 |
| T.C. Velocity ppm/°C | Shear | −55 | +76 |
|  | Longit. | −71 | +110 |
| Density gm/cc | | 4.40 | 2.203 |
| Softening Temperature (Viscosity $10^{7.6}$ Poise) in °C | | 474 | >1500 |
| Refractive index at 1 micron | | 2.7 | 1.46 |

It will be noted that acoustic velocity in the chalcogenide glass is about one-half that in fused silica. Thus, in acoustic transmission applications requiring specific delay times, the size of delay devices may be reduced by a factor of about two by replacing fused silica as the delay medium with a glass composition of the invention. In addition, although the acoustic loss on a decibel per centimeter basis of the chalcogenide glass is about twice that of fused silica, due to the low acoustic velocity in the chalcogenide glass, the loss on a decibel per microsecond basis is directly comparable to that of fused silica, the lowest-loss glassy material known.

It will also be noted from Table I that the temperature coefficients of acoustic velocity of the chalcogenide glass and fused silica are comparable in magnitude, but opposite in sign, making these two materials an excellent match for a composite ultrasonic delay line, as described above.

EXAMPLE 2

Several other compositions including compositions both from within and outside the above-described areas of the ternary systems were prepared in the manner described in Example 1 and acoustic loss and acoustic velocity measured for samples from the compositional melts. These compositions and their longitudinal loss and some longitudinal velocity values are reported in Table III. Loss values for compositions of the invention are reported at 500 megahertz, while loss values for the remaining compositions, in general being too large for convenient measurement at 500 MHz, are reported at 20 MHz.

TABLE III

| Glass Composition (atomic %) | Longit. Acoustic Loss at 20 MHz (db/cm) | Longit. Acoustic Loss at 500 MHz (db/cm) | Longit. Acoustic Velocity (cm/sec × 10⁵) |
|---|---|---|---|
| Ge-As-S | | | |
| 15-35-50 | 30 | | |
| 20-25-55 | 12 | | |
| 10-20-70 | 6 | | |
| 30-5-65 | | 10 | |
| 30-10-60 | | 18 | 2.70 |
| 33-33-33 | | 7 | 3.36 |
| 37-3-60 | | 11 | |
| 40-15-45 | | 6 | 3.15 |
| Ge-P-S | | | |
| 30-6-64 | 1 | | |
| 30-10-60 | 3 | | |
| 35-5-60 | | 13 | 2.95 |
| Ge-Sb-S | | | |
| 30-10-60 | | 12 | 2.76 |
| Ge-As-Se | | | |
| 20-12-68 | 2 | | |
| 15-35-50 | 3 | | |
| 37-3-60 | | 14 | |
| 33-12-55 | | 7 | 2.51 |
| 33-33-33 | | 8 | |
| Ge-Sb-Se | | | |
| 28-12-60 | | 12 | 2.38 |
| Ge-P-Se | | | |
| 15-15-70 | 4 | | |
| 30-10-60 | | 14 | 2.36 |
| 37-3-60 | | 20 | |

It will be seen from the table that each of the compositions falling within the above-described areas of the ternary diagrams exhibits values of acoustic loss and acoustic velocity comparable to those of the composition described in example 1, which values establish the utility of these compositions for the intended device uses.

We claim:

1. An elastic wave device comprising a glass medium along which elastic waves are transmitted, means for establishing elastic waves in said medium and means for detecting said waves after they are transmitted along said medium, characterized in that said transmission medium is a glass having a composition within an area of the ternary diagram for germanium, selenium and arsenic formed by connecting with straight lines the following point pairs:
   43 Ge, 27 Se, 30 As — 40 Ge, 20 Se, 40 As
   40 Ge, 20 Se, 40 As — 25 Ge, 20 Se, 55 As
   25 Ge, 20 Se, 55 As — 25 Ge, 73 Se, 2 As
   25 Ge, 73 Se, 2 As — 42 Ge, 56 Se, 2 As
   42 Ge, 56 Se, 2 As — 43 Ge, 27 Se, 30 As.

2. An elastic wave device comprising a glass medium along which elastic waves are transmitted, means for establishing elastic waves in said medium and means for detecting said waves after they are transmitted along said medium, characterized in that said transmission medium is a glass having a composition within an area of the ternary diagram for germanium, sulfur and arsenic formed by connecting with straight lines the following point pairs:
   44 Ge, 29 S, 27 As — 25 Ge, 29 S, 46 As
   25 Ge, 29 S, 46 As — 25 Ge, 73 S, 2 As
   25 Ge, 73 S, 2 As — 40 Ge, 58 S, 2 As
   40 Ge, 58 S, 2 As — 44 Ge, 50 S, 6 As
   44 Ge, 50 S, 6 As — 44 Ge, 29 S, 27 As.

3. An elastic wave device comprising a glass medium along which elastic waves are transmitted, means for establishing elastic waves in said medium and means for detecting said waves after they are transmitted along said medium, characterized in that said transmission medium is a glass having a composition within an area of the ternary diagram for germanium, selenium and phosphorus formed by connecting with straight lines the following point pairs:
   40 Ge, 48 Se, 12 P — 33 Ge, 47 Se, 20 P
   33 Ge, 47 Se, 20 P — 25 Ge, 52 Se, 23 P
   25 Ge, 52 Se, 23 P — 25 Ge, 73 Se, 2 P
   25 Ge, 73 Se, 2 P — 42 Ge, 56 Se, 2 P
   42 Ge, 56 Se, 2 P — 40 Ge, 48 Se, 12 P.

4. An elastic wave device comprising a glass medium along which elastic waves are transmitted, means for establishing elastic waves in said medium and means for detecting said waves after they are transmitted along said medium, characterized in that said transmission medium is a glass having a composition within an area of the ternary diagram for germanium, sulfur and phosphorus formed by connecting with straight lines the following point pairs:
   40 Ge, 54 S, 6 P — 35 Ge, 55 S, 10 P
   35 Ge, 55 S, 10 P — 33 Ge, 58 S, 9 P
   33 Ge, 58 S, 9 P — 33 Ge, 66 S, 1 P
   33 Ge, 66 S, 1 P — 40 Ge, 59 S, 1 P
   40 Ge, 59 S, 1 P — 40 Ge, 54 S, 6 P.

5. An elastic wave device comprising a glass medium along which elastic waves are transmitted, means for establishing elastic waves in said medium and means for detecting said waves after they are transmitted along said medium, characterized in that said transmission medium is a glass having a composition within an area of the ternary diagram for germanium, selenium and antimony formed by connecting with straight lines the following point pairs:
   37 Ge, 57 Se, 6 Sb — 35 Ge, 52 Se, 13 Sb
   35 Ge, 52 Se, 13 Sb — 25 Ge, 52 Se, 23 Sb
   25 Ge, 52 Se, 23 Sb — 25 Ge, 73 Se, 2 Sb
   25 Ge, 73 Se, 2 Sb — 34 Ge, 64 Se, 2 Sb
   34 Ge, 64 Se, 2 Sb — 37 Ge, 57 Se, 6 Sb.

6. An elastic wave device comprising a glass medium along which elastic waves are transmitted, means for establishing elastic waves in said medium and means for detecting said waves after they are transmitted along said medium, characterized in that said transmission medium is a glass having a composition within an area of the ternary diagram for germanium, sulfur and antimony formed by connecting with straight lines the following point pairs:
   35 Ge, 63 S, 2 Sb — 35 Ge, 55 S, 10 Sb
   35 Ge, 55 S, 10 Sb — 25 Ge, 55 S, 20 Sb
   25 Ge, 55 S, 20 Sb — 25 Ge, 73 S, 2 Sb
   25 Ge, 73 S, 2 Sb — 35 Ge, 63 S, 2 Sb.

* * * * *